3,111,546
AROMATIC HYDROCARBON CONVERSION
PROCESS
Charles E. Hemminger, Westfield, N.J., assignor to Esso
Research and Engineering Company, a corporation of
Delaware
Filed July 7, 1960, Ser. No. 41,390
5 Claims. (Cl. 260—668)

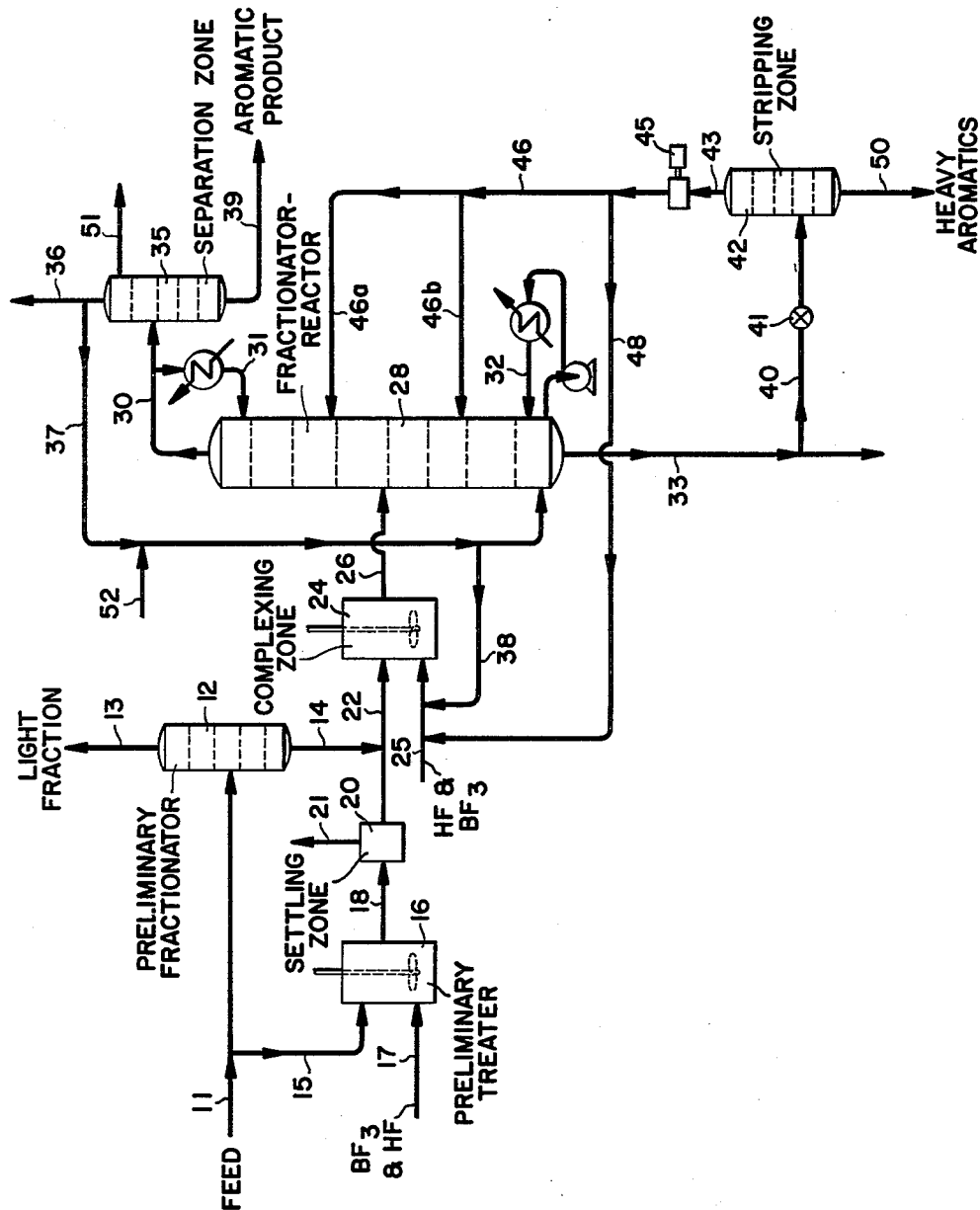

The present invention relates to the preparation of desirable aromatic hydrocarbon constituents for motor fuels and related compositions. The invention particularly concerns a disproportionation process wherein certain alkylated aromatic hydrocarbons are converted to more desirable homologs by means of a disproportionation reaction catalyzed by hydrogen fluoride and boron fluoride.

One process that has been widely used for improving the quality of petroleum fractions, particularly in the medium and heavy naphtha boiling ranges, is that known as catalytic reforming or hydroforming. Hydroforming is defined as an operation in which a petroleum naphtha is contacted at elevated temperatures and pressures in the presence of added hydrogen and a suitable catalyst under such conditions that there is no net consumption of hydrogen. The hydroforming process causes dehydrogenation of naphthenes to the corresponding aromatics, isomerization of naphthenes, and some reactions involving any paraffins that may be present. The latter reactions may include isomerization, aromatization and hydrocracking. The overall result is that the octane rating of the naphtha is increased. However, certain of the components of a powerformate are inferior to others in their antiknock performance. More specifically, it has been noted that the leaded Research Octane Number of orthoxylene is in in the order of 85–89 as compared to 110–115 for the other xylenes. For aviation gasoline or for premium automotive fuel, it is desirable to increase the octane rating of the orthoxylene by converting it to other materials. This can be accomplished by a disproportionation reaction.

It is one object of the present invention to provide an improved process for disproportionating the xylene components of an aromatic hydrocarbon fraction. In accordance with the invention, a highly aromatic hydrocarbon fraction which, for example, may be a powerformate or a selected cut thereof, is contacted with boron fluoride and hydrogen fluoride to form a complex which is then fed into a fracitonating tower. A temperature gradient is maintained in the tower so that lighter hydrocarbons may be removed overhead and thereby shift the equilibrium in the complex so as to favor the production of lighter aromatics rather than the xylenes, while at the same time reducing the concentration of ortho to paraxylenes. It is a particular feature of the process that the hydrogen fluoride and boron fluoride which are also carried overhead are recovered and recycled to the bottom of the fractionating tower to aid the reaction by extending the life of the complex in the tower and by serving to strip light hydrocarbons from the complex.

In preparing the complex, a molar excess of boron fluoride as related to the aromatic hydrocarbons is provided and, in addition, a mol ratio of hydrogen fluoride to boron fluoride of from about 2:1 to about 6:1 is present. The complexing is carried out in a temperature range of 120 to 200° F., and preferably at about 130° F. The contact time necessary to form the aromatic complex which is soluble in the liquid HF—$BF_3$ solution depends on the degree of mixing and character of the feed. It is usually in the range of 5 to 30 minutes.

The disproportionation reaction also produces a heavy aromatics bottoms product which is in the form of a complex with $BF_3$ and HF. It is another feature of the present invention that this complex after removal from the tower is decomposed and the recovered $BF_3$ and HF are returned to the system, i.e., either to the complexing zone or to the fractionation tower or both.

The nature of the invention and the manner in which the process can be conducted will be better understood when reference is made to the accompanying drawing in which the single FIGURE represents a schematic flow plan of the process.

Referring now to the figure, a suitable highly aromatic feed, which may, for example, be a dried reformate of high octane rating, is introduced by means of line 11 into a preliminary fractionator 12 where benzene and toluene as well as most of the paraffins that boil below the xylenes are removed overhead by means of line 13. The resulting heavier fraction, which will contain xylenes, ethylbenzene, and $C_9$ and heavier aromatics, is conducted by means of lines 14 and 22 to a complexing zone 24. The latter zone comprises a vessel having suitable mixing equipment. Required proportions of $BF_3$ and HF are conducted into this zone by means of line 25, and conditions are maintained to form the complex in the liquid phase.

As an alternative to the concentration of the aromatics for complexing, a suitable solvent extraction technique could be employed. Still another alternative is represented in the figure. In this alternative, the feed is sent by means of line 15 into a preliminary treating zone 16 wherein the feed is contacted with HF at atmospheric temperatures and with sufficient pressure to supply about 20–30 weight percent of liquid HF. As much as 2 to 10 percent by weight of $BF_3$ may also be added. These materials may be conducted into zone 16 by means of line 17. This treatment causes the formation of a complex with the aromatics while the paraffins do not enter into the complex. The mixture of paraffins and complex is conducted by means of line 18 into a settling zone 20 wherein the paraffins may be separated from the complex as an upper layer and removed by means of line 21. The separated complex is then conducted by means of line 22 into complexing zone 24. Additional HF and $BF_3$ are then added to the complex to provide the molar excess of $BF_3$ in the proportion of HF to $BF_3$ mentioned above.

The complex formed in zone 24 is conducted by means of line 26 into a mid portion of a distillation column 28. A temperature gradient is maintained in tower 28 by means of a suitable reflux 31 at the top of the tower and a reboiler 32 at the bottom of the tower. Sufficient holding time is provided in zone 24 and/or in distillation tower 28 to bring about the desired disproportionation. This causes the ortho and paraxylenes to be converted to metaxylene, and at the same time ethylbenzene and isopropylbenzene are disproportionated to benzene and to higher boiling aromatics.

The benzene and converted xylenes are removed along with HF and $BF_3$ overhead from the tower and conducted by means of line 30 to separation zone 35. In the latter zone, the $BF_3$ and HF are removed overhead by means of line 36 and returned by means of line 37 to the bottom of distillation tower 28. This recycle stream of $BF_3$ and HF acts as a mixing medium to agitate the liquid in the tower and also serves to strip lighter hydrocarbons from the complex in the tower. At the same time, the HF and $BF_3$ serve to replace the complexing agent that is carried overhead from the tower and thus aid in the disproportionation reaction. Recycled $BF_3$ and HF may also be diverted to complexing zone 24 by means of line 38.

Suitable temperature and pressure conditions are maintained in the tower so that the desired light aromatic fraction will be removed overhead. These conditions will depend somewhat upon the composition of the feed, the amount of HF and BF₃ recycled, and other variables but, in general, the pressures will range somewhere between 300 and 700 p.s.i.g. A representative temperature gradient in the tower will range from 150° F. at the top and 200° F. at the bottom.

The desired product of the reaction will be removed from separation zone 35 by means of line 39. As previously mentioned, this product will be higher in benzene content and in metaxylene content than the feed. The benzene and metaxylene are suitable raw materials for chemical purposes as well as more desirable components for motor fuels. For example, the benzene constitutes a high octane number, high volatility blending component where gasoline specifications call for a 50% boiling point less than 212° F. Also, the conversion of orthoxylene to the higher octane rating metaxylene is advantageous, as previously mentioned.

The bottoms from tower 28 comprise a complex of highly alkylated aromatics with BF₃ and HF. These are removed by means of line 33 and may be conducted to a stripping zone 42 through pressure reduction valve 41 which is operated at a relatively low temperature and reduced pressure to prevent tar formation during decomposition of the complex. Representative conditions are temperatures in the range of 75 to 125° F. and pressures of 10 to 50 p.s.i.a. The BF₃ and HF taken overhead in line 43 are compressed to the operating pressure of tower 28 by means of compressor 45, returned to the tower by means of line 46, and injected at suitable points in the tower by means of lines 46a and 46b. The BF₃ and HF in line 46 may also be conducted to complexing zone 24 by means of line 48.

The heavy aromatics obtained in zone 42 are removed by means of line 50. These may then be water-washed, subjected to bauxite treatment, and given any further desirable treatment to remove residual acidic material, and may then be used in diesel fuels as a high specific gravity blending component or may be added to heavy fuel oils to serve as fluxing agents.

The aromatic concentrate stream in line 14 will contain about 10 percent paraffins and about 2 percent naphthenes when the feed in line 11 is a 99 octane number powerformate. These paraffins are cracked and disproportionated as the aromatics are disproportionated in the system including zone 24 and tower 28. The light hydrocarbons will pass overhead in line 30 from fractionator 28 and can be removed as a side stream 51 in fractionator 35. Light gases such as methane and ethane will go overhead from tower 35 along with the BF₃ and HF gases. To avoid dilution of the latter gases a purge stream is withdrawn through line 36. The BF₃—HF in the purge stream is recovered by known conventional means (not shown) such as absorption or adsorption. The higher paraffinic hydrocarbons which are formed are associated with the heavy aromatics and are removed from the system through line 50.

When the feed in line 11 is rich in paraffins in the 250° F. plus fraction as when, for example, a lower octane reformate is fed, it is advantageous to feed butanes, preferably isobutane, through lines 52 and 37 to fractionator 28. Thus, a concentration of butanes in the order of 15 to 35% is built up in the BF₃—HF recycle stream in line 37. The presence of the isobutane in fractionator 28 directs the paraffin disproportionation reaction so that isobutane is consumed and most of the resulting paraffinic product is recovered from fractionator-reactor 28 through line 33 and from the system through line 50.

The following is a representative example of the conversion of a powerformate fraction employing this invention.

*Example*

100 volumes of a powerformate having a Research Octane Number, unleaded, of 99 are fed into fractionator 12. The powerformate has the following composition:

| | Volumes |
|---|---|
| O-xylene | 6.5 |
| M-xylene | 12.1 |
| P-xylene | 4.5 |
| Ethyl benzene | 9.7 |
| C₉+ aromatics | 9.4 |

Separation in tower 12 is such as to carry the 250° F. final boiling fraction overhead. The overhead fraction has the following composition.

| | Volumes |
|---|---|
| Paraffins | 30.9 |
| Benzene | 4.1 |
| Toluene | 22.8 |

The bottoms from fractionator 12 are complexed in zone 24 with 1.5 liquid volumes of BF₃ and 10 liquid volumes of HF. The complex is fed to tower 28 which is maintained at a pressure of 500 p.s.i.g. and has a top temperature of 150° F. and a bottom temperature of 200° F. The product obtained in line 39 has the following composition.

| | Volumes |
|---|---|
| Benzene | 6.6 |
| Toluene | 1.0 |
| O-xylene | 0.5 |
| M-xylene | 18.0 |
| P-xylene | 0.5 |
| C₉ aromatics | 4.7 |

10 volumes of C₁₀–C₁₆ aromatics are obtained in line 50.

It will be understood that this invention is not to be limited to the specific embodiments and examples herein presented, as modifications thereof within the spirit and scope of the invention are contemplated. The invention is defined by the claims appended hereto.

What is claimed is:

1. The process of converting a highly aromatic hydrocarbon fraction, said fraction including mixed xylenes, which comprises contacting said fraction with boron fluoride and hydrogen fluoride in a complexing zone for a time sufficient to form a complex with substantially all of said mixed xylenes, there being present a molar excess of boron fluoride as related to aromatic hydrocarbons and a mole ratio of hydrogen fluoride to boron fluoride of from about 2 to 1 to about 6 to 1, said complexing being carried out at a temperature in the range from about 120 to 200° F., transferring said complex to a fractionation zone, disproportionating the aromatic components of said complex mixture, said fractionation zone being maintained at a pressure in the range of from about 300 to 700 p.s.i.g., and having a temperature gradient which increases from a temperature of about 150° F. at the top of said zone to a temperature of about 200° F. at the bottom thereof wherein under said conditions a liquid-vapor state is maintained in said fractionation zone, removing from said fractionation zone an overhead gaseous stream containing HF, BF₃ and a light aromatic fraction, separating said HF and BF₃ from said overhead stream, continuously recycling said separated HF and BF₃ into the bottom portion of said fractionation zone which contains liquid, and removing from said bottom of said fractionation zone a complex of heavy aromatics, BF₃ and HF.

2. Process as defined by claim 1 including the steps of decomposing the said complex of heavy aromatics, BF₃, and HF and returning the thereby separated BF₃ and HF to at least one of the zones comprising the complexing zone and the fractionation zone.

3. Process as defined by claim 1 wherein said highly aromatic fraction comprises the 250° F. plus fraction of the product obtained in the hydroforming of a petroleum naphtha.

4. Process as defined by claim 1 wherein the said aromatic fraction contains paraffinic hydrocarbons, and including the steps of subjecting the said fraction to a preliminary contacting with HF whereby a complex with aromatics is formed, thereafter separating paraffin hydrocarbons from the last-named complex, and thereafter conducting the separated complex to said complexing zone.

5. Process as defined by claim 1 wherein the said aromatic fraction contains paraffin hydrocarbons, and including the step of injecting a butane into said fractionation zone.

References Cited in the file of this patent
UNITED STATES PATENTS

| | | |
|---|---|---|
| 2,521,444 | Brooke et al. | Sept. 5, 1950 |
| 2,564,073 | Lien et al. | Aug. 14, 1951 |
| 2,644,017 | McCaulay et al. | June 30, 1953 |
| 2,727,078 | Shoemaker | Dec. 13, 1955 |
| 2,766,305 | McCaulay et al. | Oct. 9, 1956 |
| 2,773,916 | Thorne et al. | Dec. 11, 1956 |
| 2,780,659 | McCaulay et al. | Feb. 5, 1957 |
| 2,848,518 | Fragen | Aug. 19, 1958 |